United States Patent
Dabrowski

(10) Patent No.: US 10,788,838 B2
(45) Date of Patent: Sep. 29, 2020

(54) SURFACE PROCESSING DEVICE AND A METHOD FOR PROCESSING SURFACE AREAS

(71) Applicant: ADVANCED DIGITAL BROADCAST S.A., Eysins (CH)

(72) Inventor: Bartosz Dabrowski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 72 days.

(21) Appl. No.: 15/836,944

(22) Filed: Dec. 11, 2017

(65) Prior Publication Data

US 2018/0164826 A1 Jun. 14, 2018

(30) Foreign Application Priority Data

Dec. 14, 2016 (EP) ...................................... 6204026

(51) Int. Cl.
*G05D 1/02* (2020.01)
*A47L 9/28* (2006.01)
*A47L 11/40* (2006.01)

(52) U.S. Cl.
CPC .......... *G05D 1/0219* (2013.01); *A47L 9/2847* (2013.01); *A47L 11/4011* (2013.01); *A47L 11/4036* (2013.01); *A47L 11/4058* (2013.01); *G05D 1/0227* (2013.01); *A47L 2201/04* (2013.01); *A47L 2201/06* (2013.01); *G05D 2201/0203* (2013.01); *G05D 2201/0215* (2013.01)

(58) Field of Classification Search
None
See application file for complete search history.

(56) References Cited

U.S. PATENT DOCUMENTS

| | | | |
|---|---|---|---|
| 8,855,914 B1 | 10/2014 | Alexander | |
| 2010/0206336 A1* | 8/2010 | Souid | A47L 5/28 134/21 |
| 2014/0283326 A1* | 9/2014 | Song | A47L 11/4041 15/319 |
| 2015/0265122 A1* | 9/2015 | Han | A47L 9/00 15/49.1 |

FOREIGN PATENT DOCUMENTS

| | | |
|---|---|---|
| EP | 2578125 A1 | 4/2013 |
| EP | 0331373 A1 | 6/2016 |

* cited by examiner

*Primary Examiner* — Todd Melton
*Assistant Examiner* — Jason R Roberson
(74) *Attorney, Agent, or Firm* — Mark M. Friedman

(57) ABSTRACT

A surface processing device for processing surface areas with obstacles, comprising a chassis, surface processing means and first and second sensory means, characterized in that it further comprises a movable assembly, adapted to affect exposure of the surface processing means to surface area, wherein the movable assembly is adapted to move, based on information from the first and the second sensory means, at least between a first position and a second position with respect to the chassis, wherein in the second position the surface processing means have different exposure to surface area than in the first position.

12 Claims, 5 Drawing Sheets

SURFACE PROCESSING DEVICE AND A METHOD FOR PROCESSING SURFACE AREAS

TECHNICAL FIELD

The present invention relates to a surface processing device and a method for processing surface areas. In particular the present invention relates to a device and a method for processing surface areas comprising obstacles.

BACKGROUND

The present invention relates mainly to a surface processing device like autonomous vacuum cleaners or mopping devices or the like. There are numerous devices available on the market and solutions described and published. For instance the publication U.S. Pat. No. 8,855,914B1 discloses a method optimizing traversing of corners and thus allows for better coverage of surface by the surface coverage apparatus. Another publication U.S. Pat. No. 6,809,490B2 discloses a system for an autonomous surface coverage device that allows to adopt the behavioural pattern of the device to the detected obstacles in order to better cover the processed surface.

Existing solutions focus on optimization of the behaviour of the device whilst assuming its constant i.e. immutable form. Hence they either provide concrete solutions to concrete problems (like the aforementioned U.S. Pat. No. 8,855,914B1) or provide general better algorithms of behaviour (like the aforementioned U.S. Pat. No. 6,809,490B2).

The present invention attempts to optimize the coverage of the processed surface by equipping the device with a movable assembly that may adopt the device to a specific type of inaccessible surface i.e. a corner of measure different than 90 degrees.

The aim of the development of the present invention is an improved and cost effective method and apparatus for processing surface areas.

SUMMARY

An object of the present invention is a surface processing device for processing surface areas with obstacles, comprising a chassis, surface processing means and first and second sensory means, which further comprises a movable assembly, adapted to affect exposure of the surface processing means to surface area, wherein the movable assembly is adapted to move, based on information from the first and the second sensory means, at least between a first position and a second position with respect to the chassis, wherein in the second position the surface processing means have different exposure to surface area than in the first position.

Preferably, in the second position the surface processing means have greater exposure to the surface area than in the first position.

Preferably, the surface processing means in the second position have different angular arrangement with respect to the surface processing device than in the first position.

Preferably, the surface processing means in the second position are exposed to a surface area of a different shape than in the first position.

Preferably, the movable assembly comprises a contact assembly for contacting obstacles, which is pivotable with respect to the chassis.

Preferably, the surface processing device further comprises a reciprocating element movable with respect to the chassis, which is adapted to actuate the contact assembly.

Preferably, the reciprocating element is adapted to actuate the contact assembly while simultaneously changing the exposure of the surface processing means to surface area.

Preferably, the contact assembly is extendable.

Another object of the present invention is a method for processing surface areas with obstacles with a surface processing device described above, comprising steps of: processing surface area; detecting an obstacle with first sensory means; checking whether the obstacle is detected with second sensory means; if no, then moving the movable assembly from a first position to a second position.

Preferably, first sensory means are sensing obstacles on one side of the device, while second sensory means are sensing obstacles on the other side of the device.

Preferably, the method further comprises step of setting device parameters according to the selected position of the movable assembly.

Preferably, the device parameters are set to increase the processing power of the surface processing means.

Preferably, the device parameters are set to power only part of the surface processing means.

Preferably, the device, after processing the obstacle, moves the movable assembly from the second position to the first position.

BRIEF DESCRIPTION OF DRAWINGS

These and other objects of the invention presented herein, are accomplished by providing a surface processing device and a method for processing surface areas. Further details and features of the present invention, its nature and various advantages will become more apparent from the following detailed description of the preferred embodiments shown in a drawing, in which.

DETAILED DESCRIPTION

The present invention is best described by an exemplary embodiment. A person skilled in the art will appreciate that some parts of the embodiments, especially those disclosed in the form of a drawing will depict elements of the embodiment out of proportion or deliberately made bigger or wider or higher or the like, all to make the drawings and description more legible. A skilled person will also appreciate that these or other parts of the embodiments may in fact be made smaller or narrower or the like as allowed by materials or specifics of the design used. This is in no way limiting to the present invention.

Figure 7:
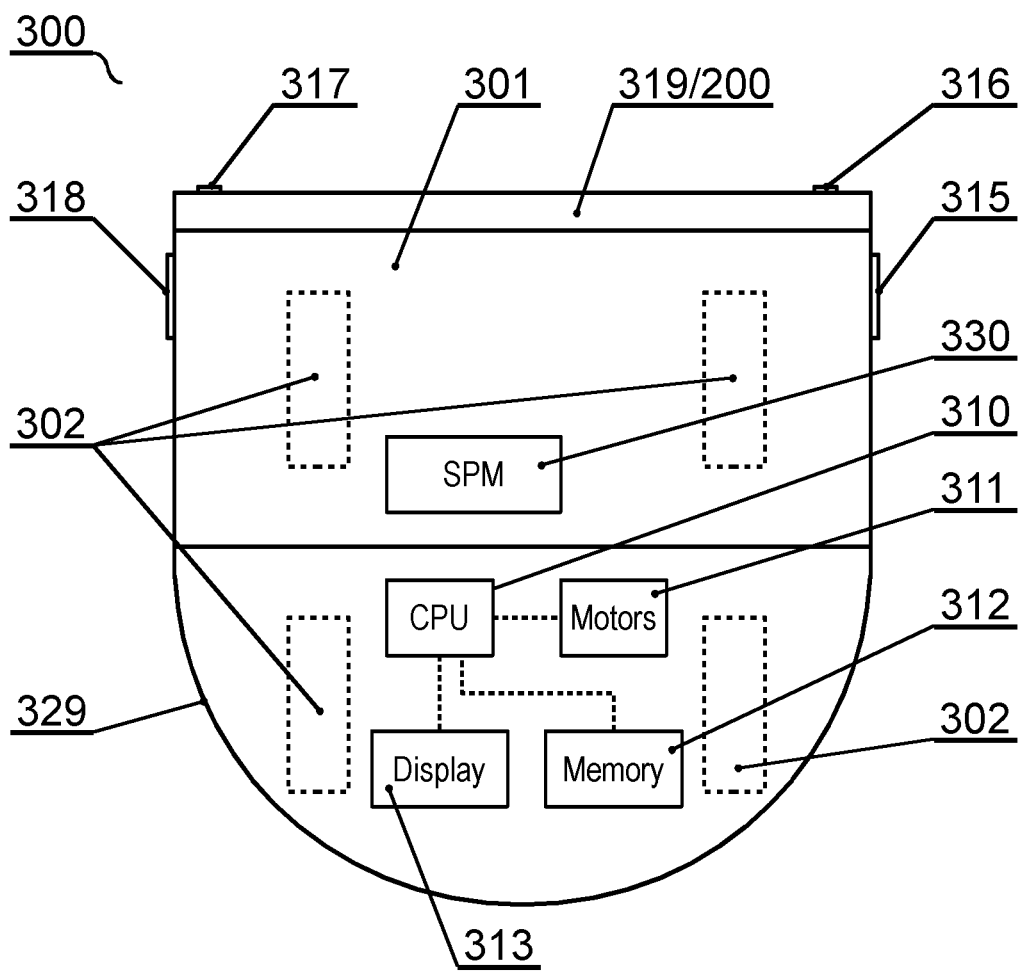
FIG. 7 presents the schematic top view of the device 300.

An exemplary device described by the present invention is depicted in FIG. 7. The device 300 comprises a chassis 329, by which it is meant a chassis of shape which is not changed with respect to other non-movable elements of the device which are attached to it. The device 300 is equipped with a CPU 310 for processing all signals, input and guiding the device. The CPU 310 has memory 312 connected to it to allow performing of computations. The device 300 may also be equipped with a display 313 for interaction with the user. The device 300 is also equipped with motors 311 to allow the device to move (including movement of the wheels 302) and change shape. The device 300 further comprises surface processing means 330, which can be any devices or arrangements intended to process the surface area, e.g. vacuum arrangements, mopping arrangements or the like. These surface processing means 330 are configured to process the surface substantially within the outline of the device 300. The device's top side is covered with the top part 301 of the chassis 329. The device comprises first and second sensory means 315, 316, 317, 318. In particular, the device in shown embodiment is equipped with one or more proximity sensors 316, 317 at the front to allow detection of situations that require change of configuration (i.e. shape). The exemplary sensors are: front left-hand side sensor 317 and front right-hand side sensor 316. Preferably the device is also equipped with more sensors to better operate in the surrounding environment. Exemplary preferred additional sensors are left-hand side proximity sensor 318 and right-hand side proximity sensor 315. The proximity sensors 315 through 318 may in fact be touch sensors or the like which is in no way limiting to the present invention. Another exemplary embodiment of the device according to the present invention may include contact sensors hidden under a bumper 319 to detect touched obstacles on either side of the bumper. In any case, in the device 300 there can be present first sensory means 315, 316 for sensing obstacles on one side of the device 300, and second sensory means 317, 318 for sensing obstacles on the other side of the device 300. Exemplary embodiments of such implementation of bumper 319 may be found in various mass-market products. The bumper 319 can be referred to as a contact assembly 200, as shown in an exemplary embodiment of the present invention.

Figure 1:
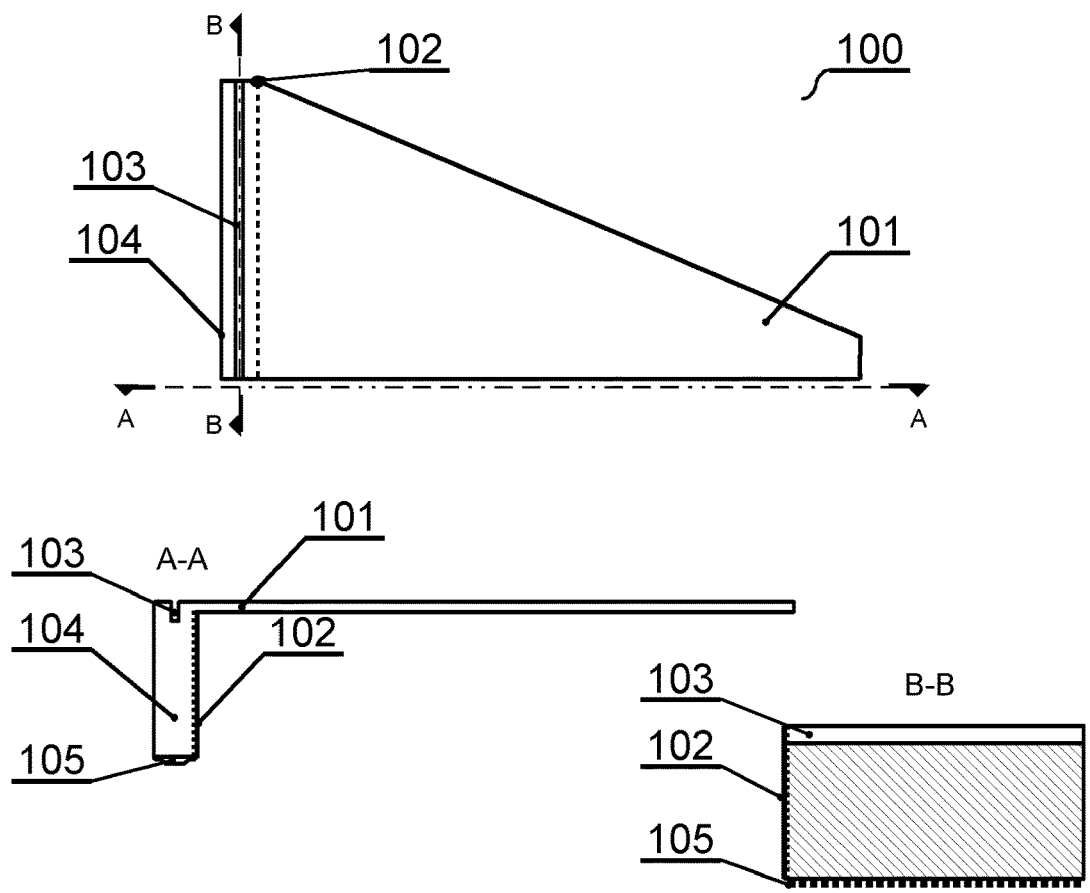
FIG. 1 presents a reciprocating member 100 of the device 300 with its respective cross sections.

FIG. 1 shows a reciprocating element 100 of the exemplary device 300 along with the part's A-A and B-B cross sections. The element 100 is able to slide from the device forward, thereby extending its shape (and consequently its outline with respect to the processed surface area). The element 100 is equipped with a flat cover element 101 that allows the top of the device to stay covered while the element 100 is in extended position. The left side part 104 of element 100 has an indentation 103 that allows it to be guided by a respective element 307 of the device 300 (as described later). The hinge 102 allows to connect the element 100 to the contact assembly 200. The element 105 allows a mechanical cog 304 to move the element 100 in order to extend the shape of the device 300.

Figure 2:
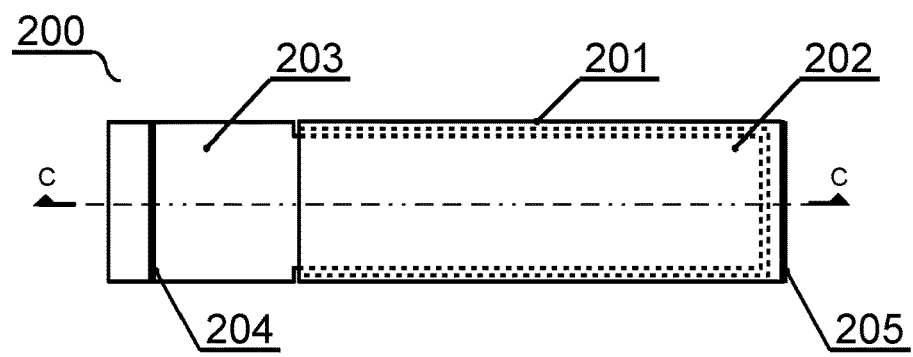
FIG. 2 presents a contact assembly 200 of the device 300 along with its respective cross-section.
Figure 2:
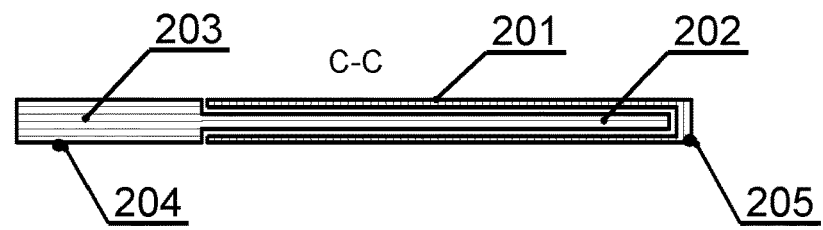

FIG. 2 shows the contact assembly 200. The contact assembly 200 is a telescopic element that can extend and retract lengthwise. The concept of a telescopic element is well known and a skilled person will recognize its purpose by the mere mention of its name in this context. A part 202 of the inner element 203 is hidden in cover element 201. The contact assembly 200 is also equipped with hinges 204 and 205 for fixing to other parts of the device 300. The hinges 204 connect to hinges 102 of part 100 and the hinges 205 connect to hinges 305 of the right-hand side of the device 300.

Figure 3:
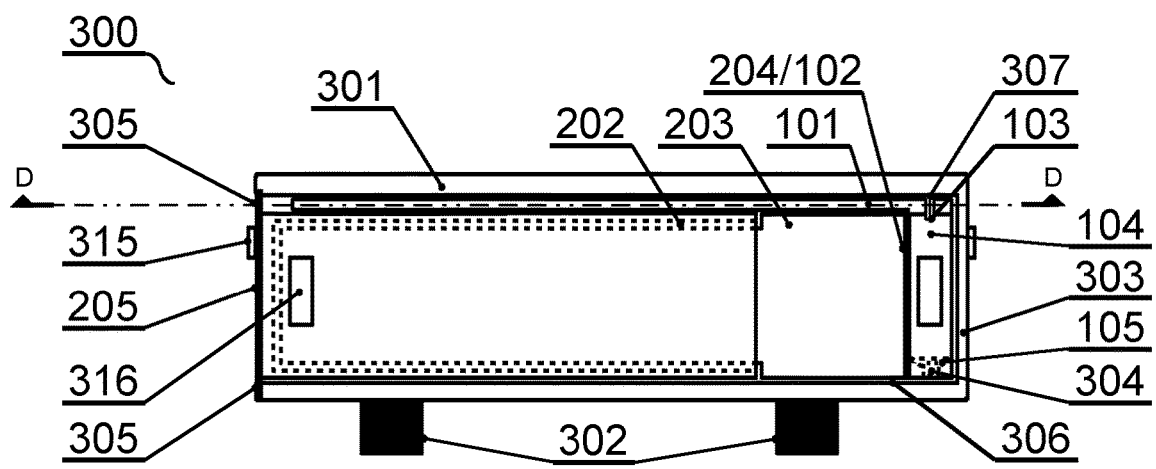
FIG. 3 presents the front view of the device 300.

Moving to FIG. 3, the front view of the device 300 is depicted. The contact assembly 200 is mounted to the device 300. The contact assembly hinges 205 connect to the hinges 305 mounted on the chassis 329 of the device 300. The chassis 329 has the top part 301 covering the device, the left-hand side part 303 covering the reciprocating element 100 (as shown later in FIG. 4) and a bottom part 306. A skilled person will recognize that the bottom part will in most cases not cover the whole device and will preferably have hole for wheels or vacuum pumps or brushes or mops or sensors or the like which is in no way limiting to the present invention. All these elements can be encompassed by one term—surface processing means 330.

An example of surface processing means is a rotating brush. Typically (as known from numerous market products) the brush's axis of rotation will be so designed as to be perpendicular to the direction of movement of the device. Typically a vacuum pump and a tunnel guiding the dust from the brush to the vacuum pump will be located directly behind the brush. Hence referring to the present embodiment of the present invention, the brush can be located under or in the vicinity of element 301 and the tunnel guiding the dust and the vacuum pump would be located further to the back of the device 300. The tunnel for guiding the dust could be flexible and/or of extendable length or cross-section. An exemplary embodiment of the adjustment of the surface processing means 330 (i.e. the brush) would in this case be fixing the brush with a telescopic axis with articulation on each end affixing the left-hand side articulation to the part 100. An preferred articulation in this case is a gimbal. The articulation allows keeping the possibility of rotating the brush while allowing it to keep its relative position towards part 200 constant.

The device is also equipped with two pairs of wheels 302 for movement.

Figure 4:
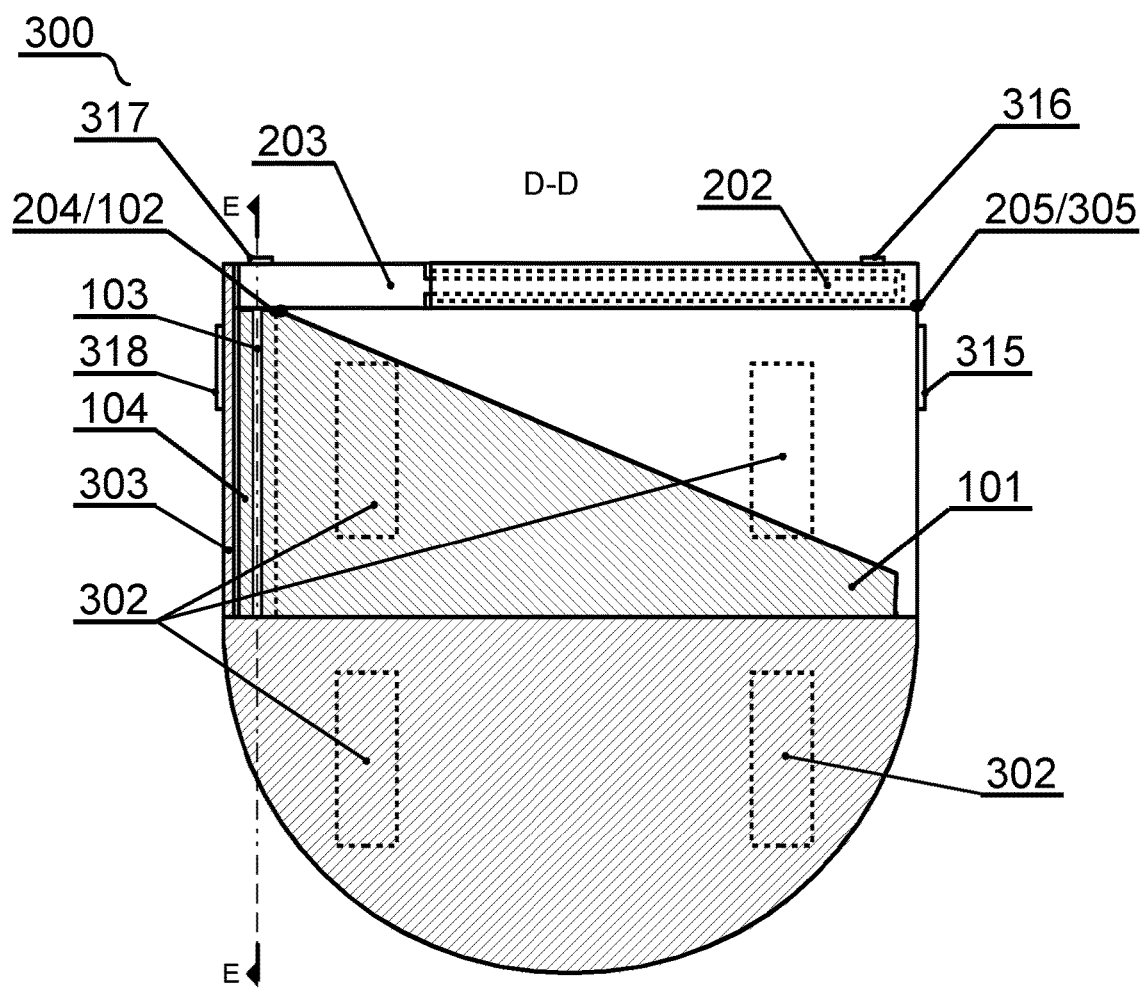
FIG. 4 presents the D-D cross section of the device 300 in a retracted configuration.

FIG. 4 shows the D-D cross section of the device 300. The reference numbers of the hinges 204/102 and 205/305 indicate the connected hinges. The movable assembly 100, 200 is in a first position. In other words, the device is in a retracted configuration.

Figure 5:
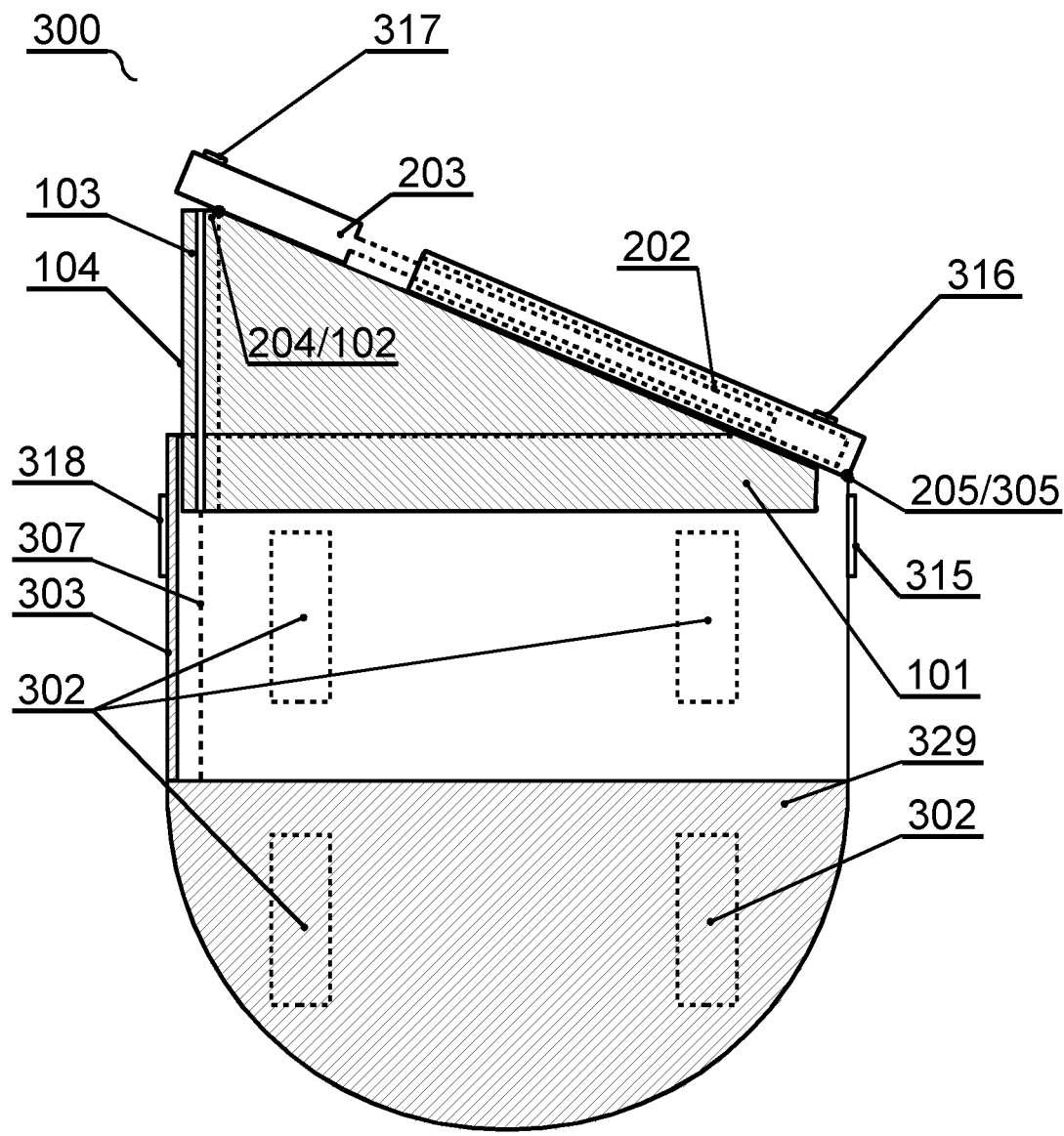
FIG. 5 presents a cross section analogous to D-D of the device 300 in an extended configuration.

FIG. 5 shows the same device 300 in an extended configuration i.e. the movable assembly 100, 200 is in a second position. The drawing is a cross section in the same plane as cross section D-D of previous drawings. The movable assembly 100, 200 is adapted to affect exposure of the surface processing means 330 to a surface area. For example, in the second position, the surface processing means 330 can be exposed at a different angle with respect to the surface processing device 300 and/or the processed surface area. A point of reference in such case could be a common axis of driving wheels, a single, non-pivotable axis of a driving wheel, or a chassis 329. Any points of fixed position within the surface processing device 300 could serve as reference points in this case. The angular arrangement can be changed within a plane parallel to the plane of a processed surface. It can also be changed within a plane parallel to the moving plane of the surface processing device 300, in which the surface processing device is intended to move. In another example, in the second position, the surface processing means 330 can be exposed to a greater area to be processed, or to an area of different shape, than in the first position. In this embodiment, the reciprocating element 100 is moved to its second position and the contact assembly 200 is adjusted accordingly, i.e. extended. In the second position of the movable assembly 200 the surface processing means 330 have different exposure to the processed surface area than in the first position. In this case, the exposure is greater and of different shape, and the surface processing means 330 are arranged at a different angle with respect to the processing device 300. The movable assembly 100, 200 can serve to enlarge the processed surface area and/or to better adapt the shape of the device 300 with respect to encountered obstacles, thereby reducing or eliminating the need to reposition the entire surface processing device 300 with respect to the obstacle and/or the processed surface area. This allows more efficient energy management, as such change in configuration might be less energy consuming than said repositioning. Further, a change in configuration (i.e. a different exposure of the surface processing means) may result in reduction of time needed to process a surface, in particular a surface with obstacles. It should be appreciated that other arrangements of movable assembly are possible based on the disclosed principle. For example, the movable assembly could comprise more reciprocating elements, e.g. arranged in parallel, and operating substantially independent from each other with cooperation with their respective contact assemblies and surface processing means. Such reciprocating elements could have complementary shapes, e.g. arranged symmetrically with respect to each other, and operate analogously to the disclosed principle. This could further facilitate energy and time management. For example, in case of a smaller obstacle, only a part of the movable assembly, e.g. only a left or a right side could be extended, thereby using less energy for both actuating the reciprocating element and utilizing smaller part of surface processing means or powering them to a lesser extent.

Figure 6:
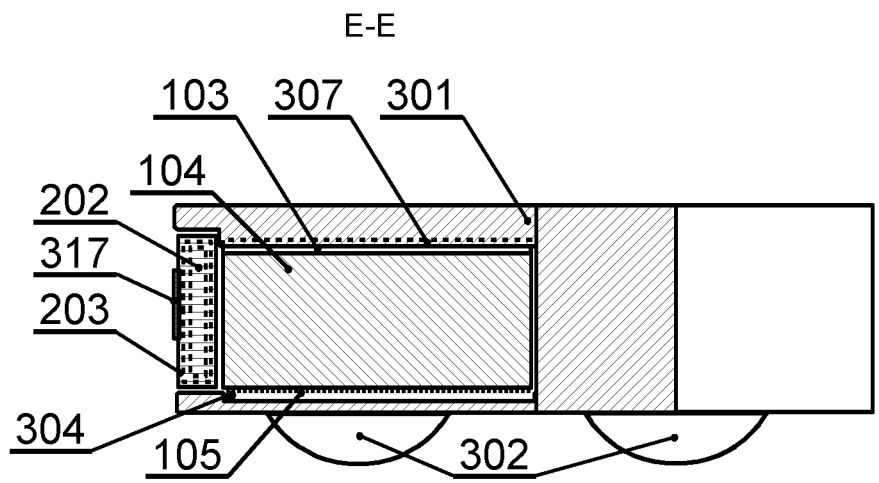
FIG. 6 presents the E-E cross-section of the device 300 depicting the mounting of the parts 100 and 200 in the device 300.

FIG. 6 shows the E-E cross section depicted in FIG. 4 of the device 300. It shows the mounting of the element 100 in the device 300. The element 105 is moved by the cog 304 which allows the reciprocating element 100 to extend from the chassis 329. The movement of element 100 is guided by extension 307 of the part 301 which fits into the indentation 103 of part 100.

A skilled person will appreciate that the shape of cover 101 may be improved. In the presented embodiment there exists an uncovered gap between element 100 and assembly 200 while in a stage of extending from stage depicted in FIG. 4 and stage depicted in FIG. 5. Thus the shape of the cover 101 may be improved or changeable or the like. In another embodiment an additional cover may be added and attached to contact assembly 200 in order to additionally cover the gap. These elements were omitted intentionally to make the drawings and design simpler and thus more descriptive. They are apparent extensions to the present embodiment of the present invention.

Figure 8:
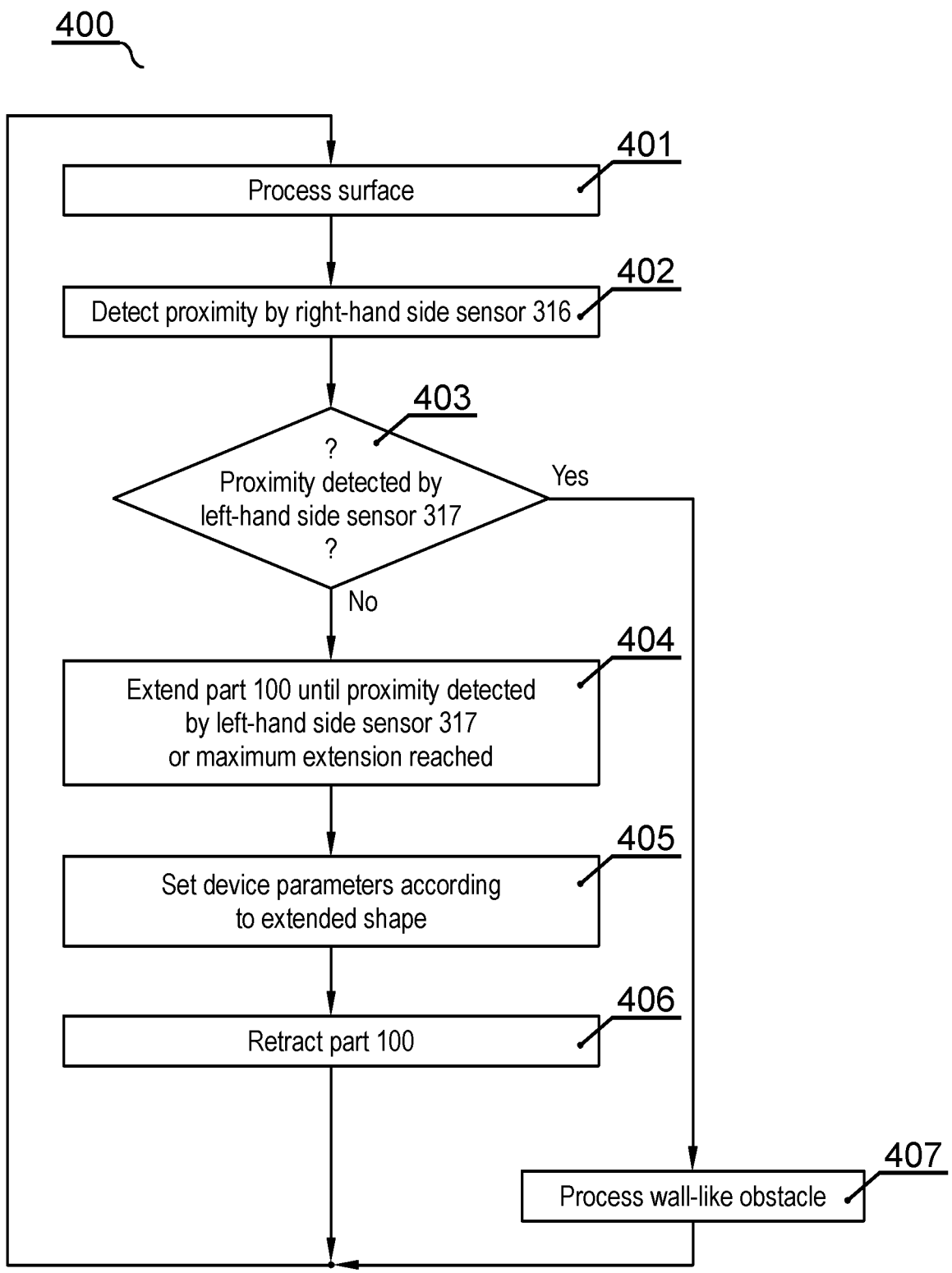
FIG. 8 presents an exemplary method of operation of the device 300.

FIG. 8 presents an exemplary operation method 400 according to the present invention, utilizing the above-described device. The method 400 begins at step 401 with processing of the surface. This can involve all actions done by the device comprising movement, vacuuming, avoiding or tracking obstacles, path prediction or the like. Next at step 402, obstacle proximity is detected by first sensory means, e.g. by the right-hand side sensor 316. Subsequently it is verified at step 403 whether second sensory means, e.g. the left-hand side sensor 317, also detected proximity. If so, the device proceeds to handling of a wall-like obstacle. If at step 403 the second sensory means, e.g. left-hand side sensor 317, do not detect proximity, it is assumed that a different obstacle distance for the first sensory means, e.g. right-hand side sensor 316, and the left side of the device exists and the device proceeds to step 404. The movable assembly 100, 200 is moved from a first position to a second position. In case of the exemplary embodiment presented above, the device extends the reciprocating element 100, with the contact assembly 200 adjusting itself to such extended configuration. At step 404 element 100 is extended until either proximity is detected by the second sensory means, e.g. left-hand side sensor 317 or until maximum extension of part 100 is reached. Next, at step 405, the device 300 can set any parameters of its operation to values respective for the second position of the movable assembly, e.g. extended state. An exemplary embodiment of such setting of parameters comprises an increase of processing power of the surface processing means 330, e.g. of suction of a vacuum unit. In another example, the parameters could be set to power only part of the surface processing means 330. Another exemplary embodiment of such setting of parameters comprises no actions at all. Another exemplary embodiment of such setting of parameters comprises movement of the device to further process a part of the surface according to other possible sensory input. Subsequently, at step 406 the device can move the movable assembly 100, 200 from the second position to the first position, e.g. can retract part 100 to return to the original shape and proceed back to step 401 to process the surface.

A skilled person will appreciate that the movement path of the device may further be adjusted at step 405 to best process the detected gap e.g. other sensors may be used to determine whether the device may or should rotate to process more surface or move in reverse to avoid obstacle or to approach the detected obstacle/gap from a different angle or side. These and other possible methods are in no way limiting to the present invention, they are merely further extensions that may be applied to further advance the usability of the present invention.

The present invention allows for better coverage of the processed surface area by the surface processing device.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A surface processing device for processing surface areas with obstacles, comprising:
   a chassis having an outline;
   a surface processing arrangement located within the outline and configured to process surface area within the outline;
   a first sensor arrangement and a second sensor arrangement, each of the sensor arrangements including a first sensor and a second sensor, wherein the first sensor of the first sensor arrangement and the first sensor of the second sensor arrangement are deployed on substantially opposing sides of the chassis; and
   a movable assembly configured to affect the outline of the chassis so as to affect exposure of the surface processing arrangement to surface area, and wherein the movable assembly is further configured to move, based on information from the first sensor arrangement and the second sensor arrangement, at least between a first position and a second position with respect to the chassis, wherein in the second position the surface processing arrangement has different exposure to surface area than in the first position, and wherein the movable assembly includes:
- an extendable contact assembly for contacting obstacles, the extendable contact assembly hingedly coupled to a portion of the chassis adjacent to the first sensor of the first sensor arrangement so as to be pivotable with respect to the chassis, and wherein the second sensor of the first sensor arrangement and the second sensor of the second sensor arrangement are deployed at substantially opposing ends of the extendable contact assembly, and
- a reciprocating element movable with respect to the chassis and configured to actuate the extendable contact assembly while simultaneously changing the exposure of the surface processing arrangement to surface area, wherein when the movable assembly assumes the first position the extendable contact assembly assumes a first length and extends substantially between the opposing sides of the chassis associated with the first sensor of the first sensor arrangement and the first sensor of the second sensor arrangement, and wherein when the movable assembly assumes the second position the extendable contact assembly is pivoted away from the chassis and assumes a second length greater than the first length.

2. The surface processing device according to claim 1, wherein in the second position the surface processing arrangement has greater exposure to surface area than in the first position whereas the movable assembly includes a cover configured to cover the exposure area in the second position.

3. The surface processing device according to claim 1, wherein in the second position the surface processing arrangement has different angular arrangement with respect to the surface processing device than in the first position.

4. The surface processing device according to claim 1, wherein in the second position the surface processing arrangement is exposed to a surface area of a different shape than in the first position.

5. A method for processing surface areas with obstacles, comprising:
   processing surface area with a surface processing device that includes a chassis having an outline, a surface processing arrangement located within the outline and configured to process surface area within the outline, a first sensor arrangement and a second sensor arrangement each of the sensor arrangements including a first sensor and a second sensor wherein the first sensor of the first sensor arrangement and the first sensor of the second sensor arrangement are deployed on substantially opposing sides of the chassis, and a movable assembly configured to affect the outline of the chassis so as to affect exposure of the surface processing arrangement to surface area, and wherein the movable assembly is further configured to move, based on information from the first sensor arrangement and the second sensor arrangement, at least between a first position and a second position with respect to the chassis, wherein in the second position the surface processing arrangement has different exposure to surface area than in the first position, and wherein the movable assembly includes an extendable contact assembly for contacting obstacles that is hingedly coupled to a portion of the chassis adjacent to the first sensor of the first sensor arrangement so as to be pivotable with respect to the chassis and a reciprocating element movable with respect to the chassis and configured to actuate the extendable contact assembly while simultaneously changing the exposure of the surface processing arrangement to surface area, and wherein the second sensor of the first sensor arrangement and the second sensor of the second sensor arrangement are deployed at substantially opposing ends of the extendable contact assembly;

detecting an obstacle with the second sensor of the first sensor arrangement;

checking whether the obstacle is detected with the second sensor of the second sensor arrangement; and moving the movable assembly from the first position to the second position if the obstacle is not detected with the second sensor of the second sensor arrangement, wherein when the movable assembly assumes the first position the extendable contact assembly assumes a first length and extends substantially between the opposing sides of the chassis associated with the first sensor of the first sensor arrangement and the first sensor of the second sensor arrangement, and wherein when the movable assembly assumes the second position the extendable contact assembly is pivoted away from the chassis and assumes a second length greater than the first length.

6. The method according to claim 5, wherein the first sensor arrangement senses obstacles on one side of the device, while the second sensor arrangement senses obstacles on the other side of the device.

7. The method according to claim 5, further comprising:
   setting device parameters according to a selected position of the movable assembly.

8. The method according to claim 7, wherein the device parameters are set to increase a processing power of the surface processing arrangement.

9. The method according to claim 7, wherein the device parameters are set to power only part of the surface processing arrangement.

10. The method according to claim 5, further comprising:
    moving the movable assembly from the second position to the first position after processing the obstacle.

11. The method according to claim 5, wherein in the second position the surface processing arrangement has greater exposure to surface area than in the first position whereas the movable assembly includes a cover configured to cover the exposure area in the second position.

12. The surface processing device according to claim 1, wherein the chassis includes:
    - a cover that includes a guiding element, and
    - a mechanical cog coupled to the reciprocating element so as to move the reciprocating element, wherein the reciprocating element includes an indentation that receives the guiding element so as to be guided by the guiding element during movement of the movable assembly between the first and second positions.

* * * * *